(12) United States Patent
Chen (10) Patent No.: US 9,897,085 B2
(45) Date of Patent: Feb. 20, 2018

(54) PUMP CONTROL DEVICE

(71) Applicant: Ding Hwa Co., Ltd., Taipei (TW)

(72) Inventor: Kwang-Tsan Chen, Taipei (TW)

(73) Assignee: DING HWA CO., LTD., Taipei (TW)

( * ) Notice: Subject to any disclaimer, the term of this patent is extended or adjusted under 35 U.S.C. 154(b) by 540 days.

(21) Appl. No.: 14/535,290

(22) Filed: Nov. 6, 2014

(65) Prior Publication Data

US 2016/0131129 A1    May 12, 2016

(51) Int. Cl.
*F04B 49/00*   (2006.01)
*F04B 49/06*   (2006.01)
*H04W 4/00*   (2018.01)

(52) U.S. Cl.
CPC ........... *F04B 49/065* (2013.01); *H04W 4/008* (2013.01); *F04B 2207/01* (2013.01); *Y02B 60/50* (2013.01)

(58) Field of Classification Search
CPC .. F04B 49/065; F04B 2207/01; H04W 4/008; Y02B 60/50
USPC .......................................................... 700/282
See application file for complete search history.

(56) References Cited

U.S. PATENT DOCUMENTS

| | | | | |
|---|---|---|---|---|
| 6,092,260 A * | 7/2000 | Kai | ....................... | B05B 7/2416 |
| | | | | 15/320 |
| 6,892,960 B2 * | 5/2005 | Ptak | ....................... | B05B 7/2416 |
| | | | | 239/346 |
| 2004/0107612 A1 * | 6/2004 | Jung | ....................... | B42D 9/04 |
| | | | | 40/343 |
| 2004/0167675 A1 * | 8/2004 | Bednorz | ................ | B05B 12/00 |
| | | | | 700/283 |
| 2005/0046382 A1 * | 3/2005 | Chuang | ................ | H02J 7/0042 |
| | | | | 320/107 |
| 2008/0003111 A1 * | 1/2008 | Turan | ..................... | F04B 27/06 |
| | | | | 417/234 |
| 2010/0078088 A1 * | 4/2010 | Navarro | ................... | A41G 5/02 |
| | | | | 137/565.12 |
| 2010/0215599 A1 * | 8/2010 | Giron | ..................... | A61K 8/70 |
| | | | | 424/59 |
| 2010/0253468 A1 * | 10/2010 | Devecka | ................ | A63H 33/22 |
| | | | | 340/3.1 |
| 2011/0216188 A1 * | 9/2011 | Thwing | .................... | G06K 9/00 |
| | | | | 348/135 |
| 2012/0173028 A1 * | 7/2012 | Wui | ........................ | A61L 9/14 |
| | | | | 700/283 |
| 2015/0102121 A1 * | 4/2015 | Dey | ........................ | B05B 7/32 |
| | | | | 239/1 |

* cited by examiner

*Primary Examiner* — Christopher E Everett
(74) *Attorney, Agent, or Firm* — Leong C. Lei (57) ABSTRACT

An improved pump control device includes a control device that controls power supplied to a pump, a working device that is connected to the pump to control fluid to flow, and a detection device for detecting the working device. The detection device, when detecting the working device is making a specific operation, transmits operation information to the control device to change the operation condition of the pump so as to achieve advantages of easy use, power saving, and cost reduction.

11 Claims, 8 Drawing Sheets

PUMP CONTROL DEVICE

TECHNICAL FIELD OF THE INVENTION

The present invention generally relates to a pump control device, and more particularly to control of fluid pressure or flow rate to be supplied to a working device for easy use, power saving, and low reduction.

DESCRIPTION OF THE PRIOR ART

In certain fields, pumps are used to help working devices (such as pneumatic tools and hydraulic tools or the likes) to achieve desired functionality. It is sometimes desired, for the use of a pump in pneumatic or hydraulic fields, to allow the pump to achieve a desired function without being directly controlled. Control is generally a wide field. For example, the common way of simply switching on and off a pump can just suit the need for control, where the pump is caused to operate when the working device is put into operation and vice versa.

The most commonly used one of the pump operation systems that are currently known relies on the pressures of the working device and the pump to achieve the control. Such a way is only useful in applications where a pressure difference exists between activation and de-activation of the pump. When the working device is shut down, which causes a rise of the pressure to a predetermined pressure level, a pressure detection element is activated and signals and shuts down the pump. When the working device is put into operation so as to have the pressure drop down to a predetermined level, the pressure detection element signals and starts the pump to operate.

Such a way provides only an acceptable control performance, which is generally not an ideal one. Such a known way of control has numerous drawbacks, among which the best operation is only achieved in a condition that the entire system is free of air leakage. However, such an ideal condition can only be achieved at the expense of a great cost. It is often that improving the leakage problems results in influence of flow rate or causing undesired noise, and consequently, poor performance or inconvenience of use may result. In addition, the range of application of such a known solution is limited, where control may fail when a pressure difference is not significant in the conventional pump control system.

SUMMARY OF THE INVENTION

Thus, in view of the above problems, the present invention aims to provide an improved pump control device that is easy to use, saves electrical power, and reduces costs.

The primary object of the present invention is to achieve an effect of automatic control according to an operation mode of a working device so as to save electrical power, reduce cost, make the use easy and also to expand the range of application to achieve raised cost benefit and to realize improved coordination between the working device and the pump.

To achieve the above object, the present invention comprises a pump, a working device, a detection device, and a control device. The control device is in information communication with the detection device and the pump. The pump and the working device are connected to each other. When the detection device determines a working condition of the working device according to the direction, location, or operation thereof, the detection device generates and transmits operation information to the control device so that the control device carries out control of the pump according to the operation information to achieve a desired operation condition, wherein the control of the operation condition the pump is wide, such as control of power supply, flow rate, pressure, or fluid direction of the pump.

With the above technique, the problems of a conventional pump control system that has a high manufacturing cost, has a low flow rate, consumes (and wastes) electrical power, and is inconvenient for successively switching on and off can be overcome to achieve the advantages of easy use, reduced electricity supply, and reducing cost.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-6, the present invention comprises a pump 1, a working device 4, a detection device 3, and a control device 2.

The working device 4 and the pump 1 are connected with each other for controlling a fluid to flow. The working device 4 can be a pneumatic or hydraulic tool (such as a spraying pen, a spraying gun, an air supply gun, and a medical conduit). The pump 1 is a mechanical device (such as an air compressor) that uses suction force or pressure to supply or move liquid or to compress gas or to drive air into an object to be inflated. The pump 1 and the control device 2 are in information communication with each other and the detection device 3 and the control device 2 are in information communication with each other. Further, communication between the pump 1, the detection device 3, or the control device 2 can be achieved with cabled or wireless communication technology. The pump 1, the control device 2, or the detection device 3 is connected to at least one external power supply 5 to receive the supply of electrical power therefrom (where the control device 2 is shown connected to the external power supply 5 as an example of illustration). The external power supply 5 comprises a regular power supply, an industrial power supply, or a battery.

The detection device 3 can be one of a micro-switch, an infrared sensor, a photo-sensor, a magnetic sensor and a magnetic element, a radio frequency identification (RFID) device and a recognizing element, a direction sensor, or an image positioner. The detection device 3 detects a moving direction, a location, or an operation mode of the working device 4 to determine a working condition thereof and generate and transmit corresponding operation information to the control device 2. The pump 1 supplies, according to the operation information, different fluid flow rates, fluid pressures, or fluid directions. Thus, the control device 2 can achieve control of the pump 1 and change of the operation condition thereof according to the operation information acquired through the detection device 3. In addition, the working condition mentioned above can be an active state or an inactive state. When working device 4 gets into the active state, the control device 2 controls the pump 1 to active, and vice versa.

Further, physical connections may be established between the pump 1, the detection device 3, or the control device 2. The detection device 3 and the control device 2 can be arranged inside an enclosure or physically coupled to the enclosure or can alternatively be components that are connected to the enclosure. Further, connection between the pump 1, the detection device 3, or the control device 2 can alternatively be achieved with wireless communication technology.

Figure 1:
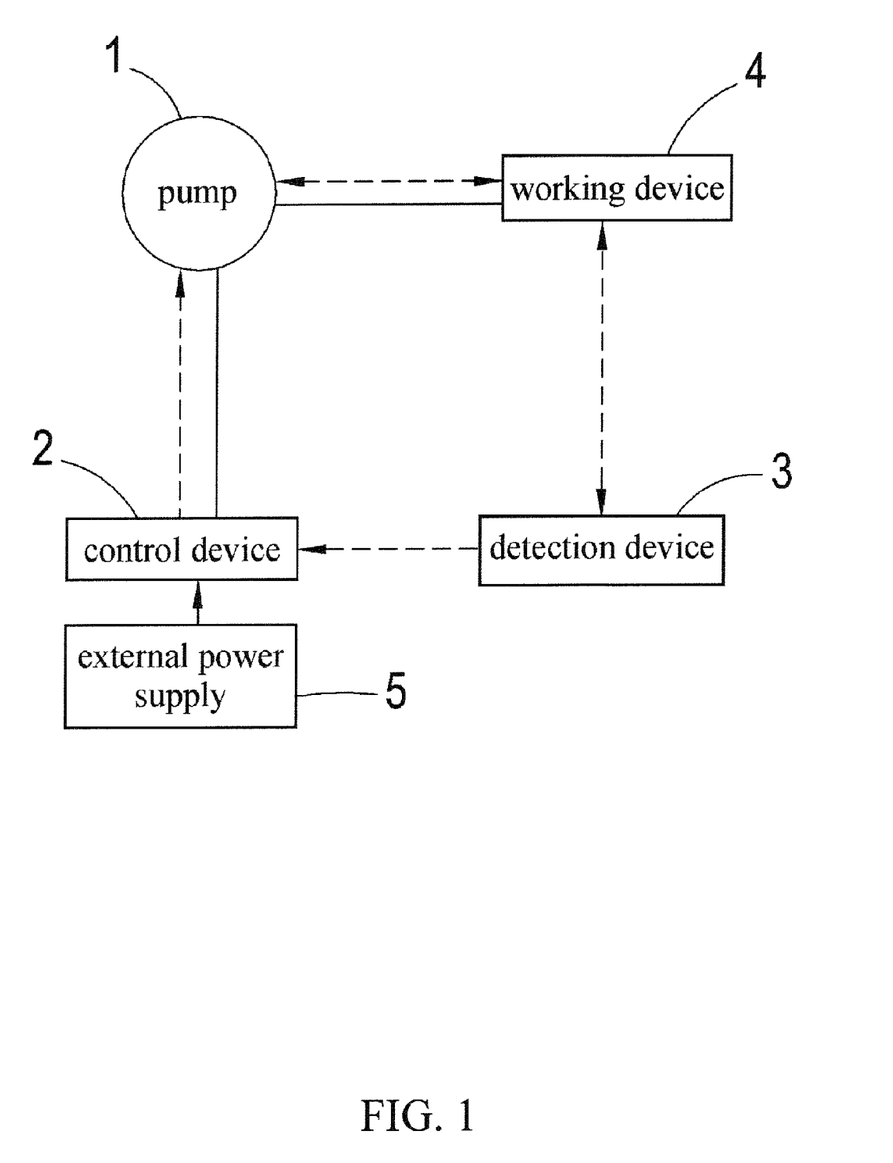
FIG. 1 is a block diagram of a preferred embodiment of the present invention.

As shown in FIG. 1, solid lines indicate physical connection, while phantom lines indicates wireless or cabled information communication. The control device 2 is set to connect to the external power supply 5. It can be inferred that at an attempt to change the operation of the working device 4, the detection device 3 detects the moving direction, the location or the operation mode of the working device 4 to generate the operation information and transmits the operation information to the control device 2, so that the control device 2 carries out control of the pump 1 according to the operation information for changing the operation condition of the pump 1, such as cutting off power supply and pressurizing and moving fluid, to allow the working device 4 to carry out a desired operation.

Figure 2:
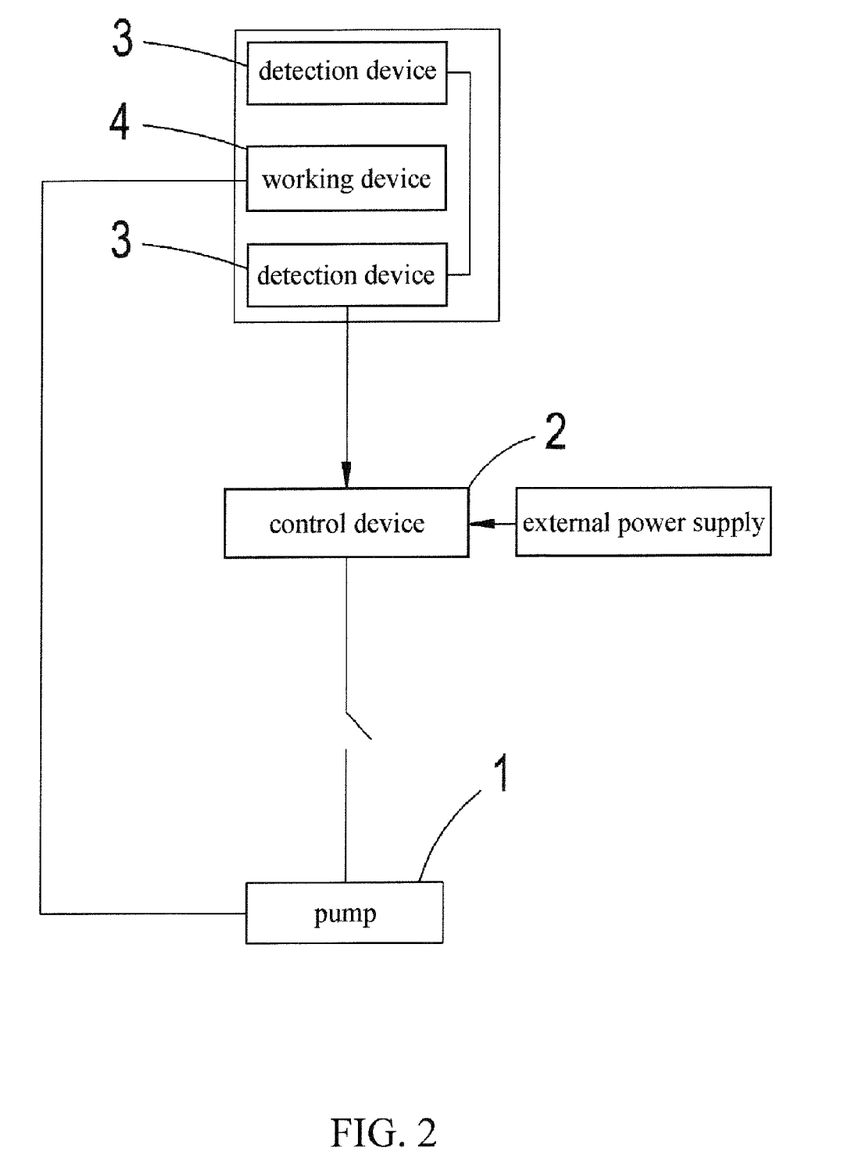
FIG. 2 is a schematic view showing an infrared application of a preferred embodiment of the present invention.

As shown in FIG. 2, the detection device 3 is illustrated as infrared detection devices 3 for illustrative explanation. When the working device 4 is placed between the detection devices 3 (namely in a detection zone) to block an infrared ray, the detection devices 3 issue a signal to have the control device 2 cuts off power supplied to the pump 1.

Figure 3:
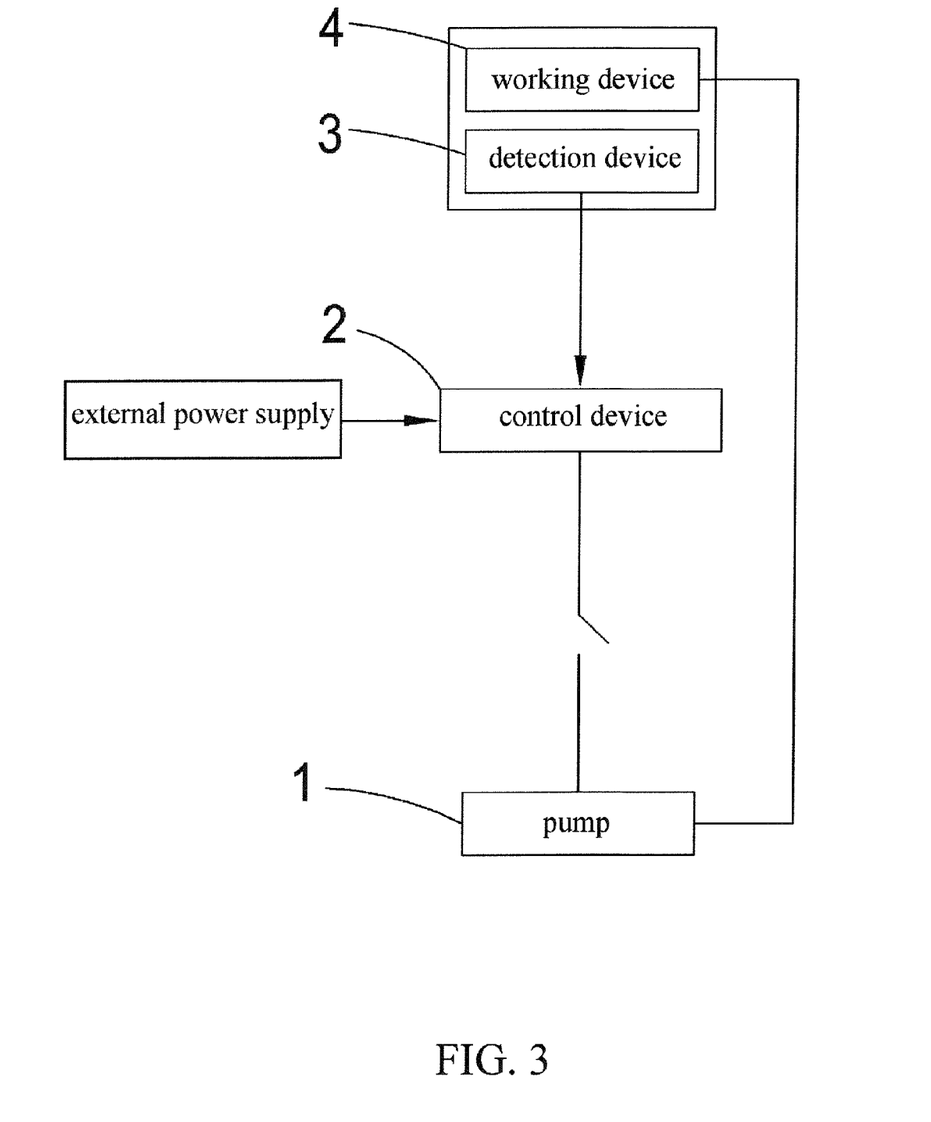
FIG. 3 is a schematic view showing a light detection application of a preferred embodiment of the present invention.

Referring to FIG. 3, the detection device 3 is illustrated as a photo or light detection device 3 for illustrative explanation. When the working device 4 is positioned so as to block the light of the detection device 3 (namely in a detection zone), the detection device 3 issues a signal to have the control device 2 cuts off power supplied to the pump 1.

The illustration of and explanation made in association with FIGS. 2 and 3 indicate that the detection device 3 can make detection in at least one detection zone in order to determine if the working device 4 is in the detection zone for generation of the operation information in order to set the working device 4 in an active state or an inactive state.

Figure 4A:
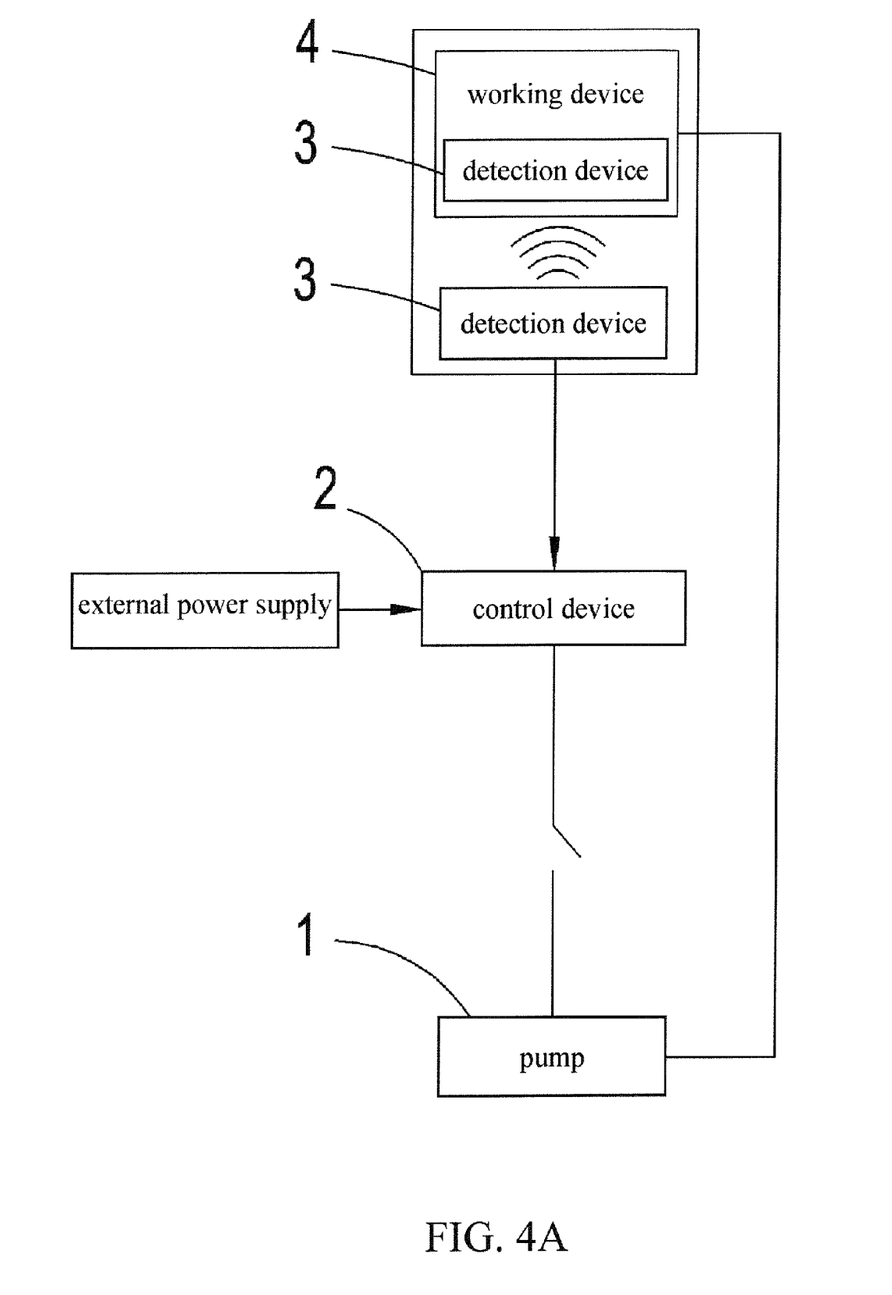
FIG. 4A is a schematic view showing a magnetic detection application of a preferred embodiment of the present invention.
Figure 4B:
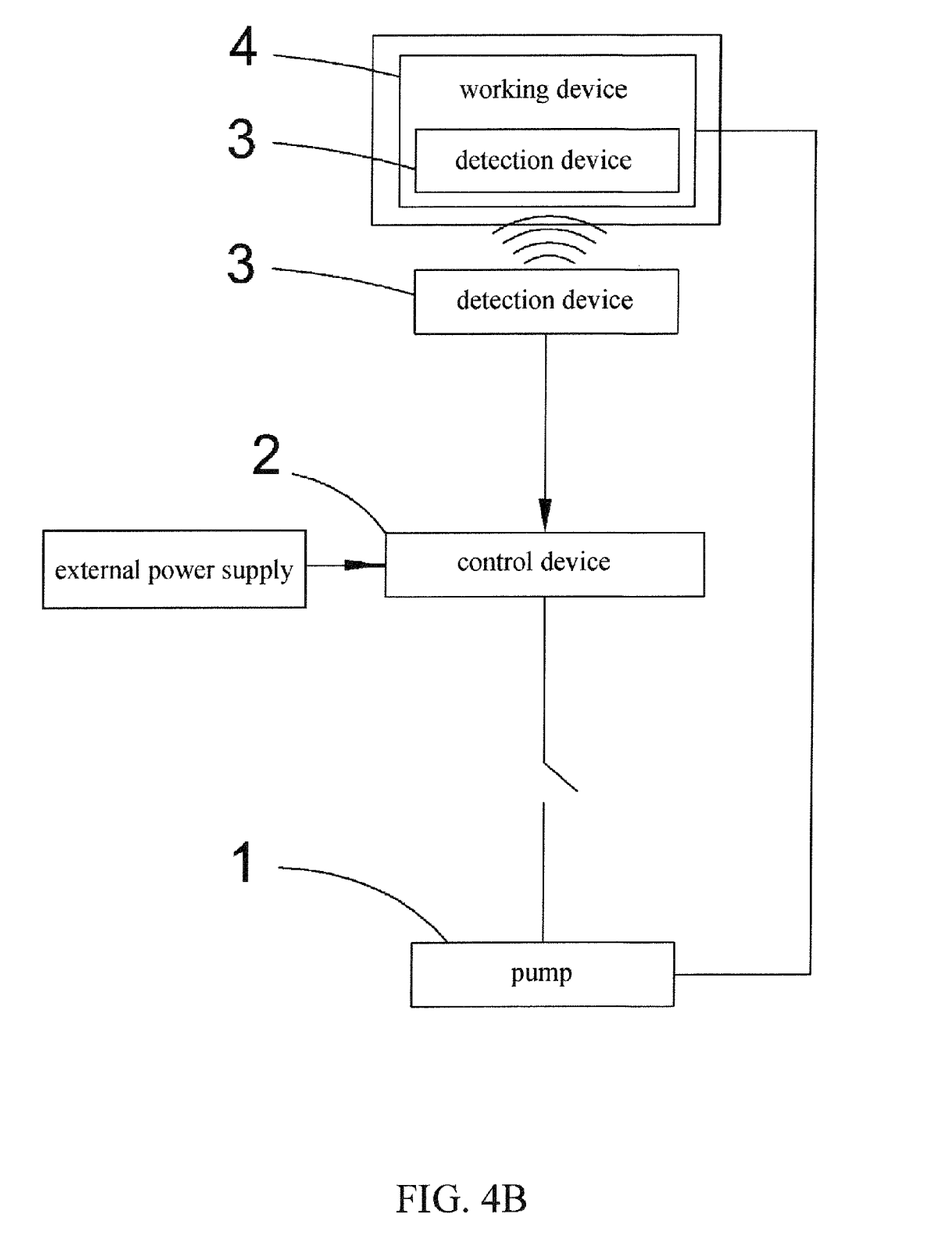
FIG. 4B is a schematic view showing radio frequency identification application of a preferred embodiment of the present invention.

As shown in FIGS. 4A and 4B, the detection device 3 is illustrated as a magnetic detection device and a magnetic element mounted on the working device 4 for illustrative explanation. When the working device 4 is placed at a specific location or in a detection zone of the magnetic detection device, the magnetic detection device detects the magnetic field of the magnetic element so that the detection device 3 issues a signal to have the control device 2 cuts off power supplied to the pump 1. Further, since the magnetic element and the magnetic detection device are activated with detection of magnetic field, the magnetic element can be spaced from the magnetic detection device by a distance, thereby allowing for easier use.

Further, the detection device 3 is illustrated as an RFID device and a recognizing element mounted to the working device 4 for illustrative explanation. When the working device 4 is placed at a specific location or in a detection zone of the RFID device, radio frequency communication between the RFID device and the recognizing element allows the detection device 3 to issue a signal to have the control device 2 cuts off power supplied to the pump 1. Further, since the recognizing element and the RFID device are operable through radio frequency communication, the RFID device can be spaced from the recognizing element by a distance, thereby allowing for easier use.

The illustration of and explanation made in association with 4A and 4B indicate that the detection device 3 uses wireless detection technology to determine if the working device 4 is at a specific location or in the detection zone for generation of the operation information in order to set the working device 4 in a active state or an inactive state.

Figure 5A:
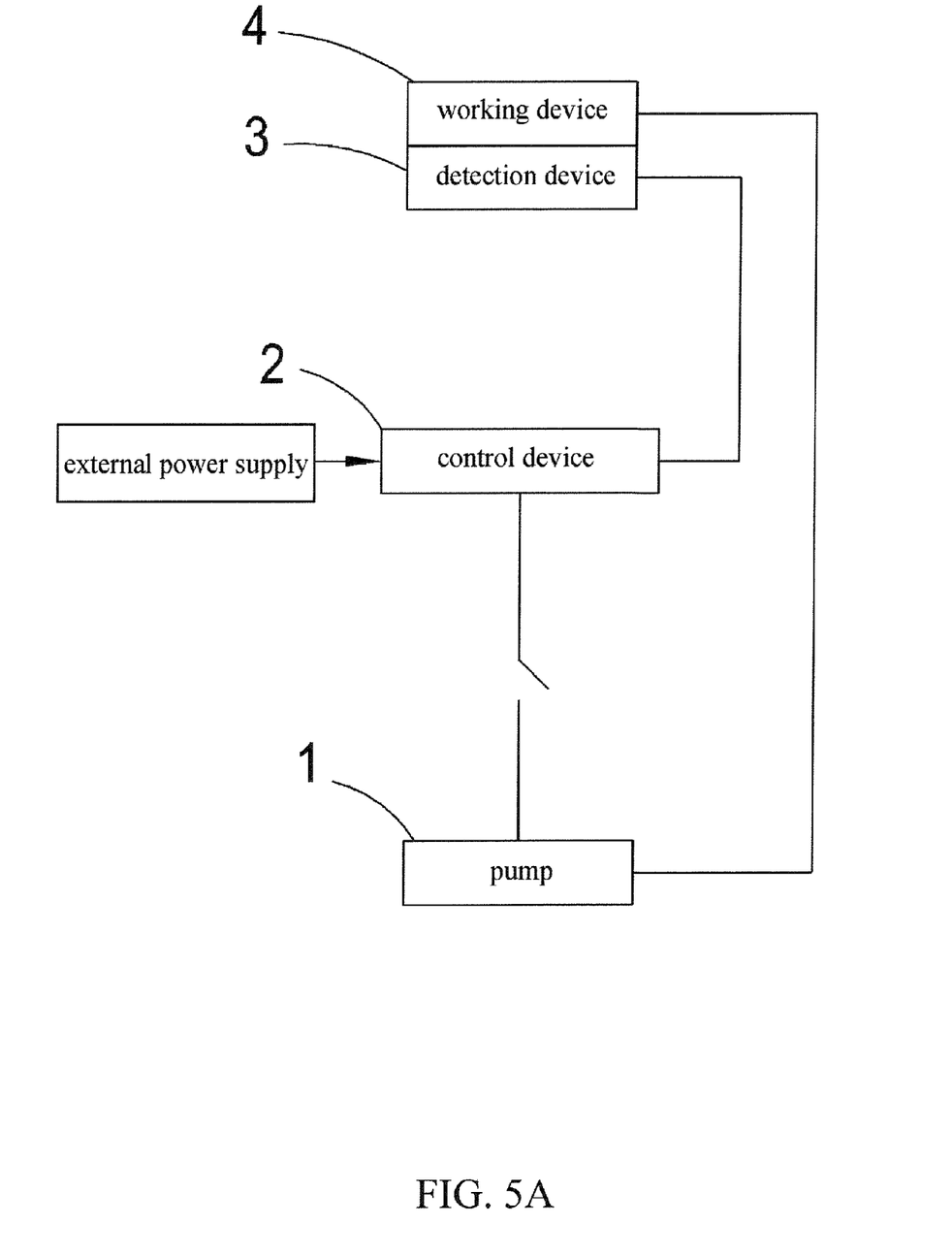
FIG. 5A is a schematic view showing cabled direction detection of a preferred embodiment of the present invention.
Figure 5B:
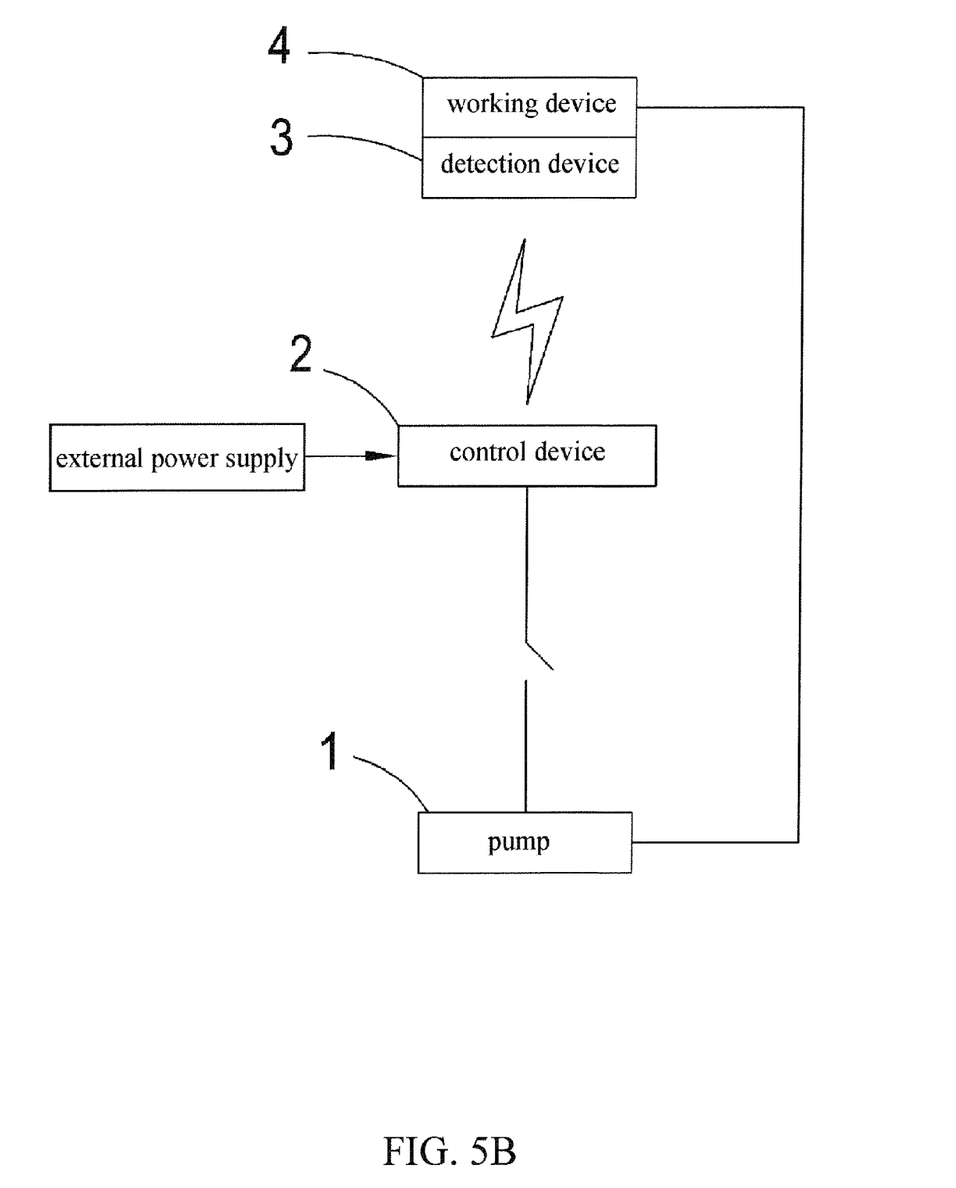
FIG. 5B is a schematic view showing wireless direction detection of a preferred embodiment of the present invention.

Referring to FIGS. 5A and 5B, the detection device 3 is illustrated as a direction sensor (such as a gyroscope) for illustrative explanation. The detection device 3 is mounted on the working device 4 to detect the moving direction or the operation mode (such as angular acceleration) of the working device 4 and transmits, in response to the result of defection, operation information to the control device 2 in order to change the operation, the fluid flow rate, the fluid pressure or the fluid direction of the pump 1. Further, the detection device 3 can be set in information communication with the control device 2 through cabled or wireless technology.

Figure 6:
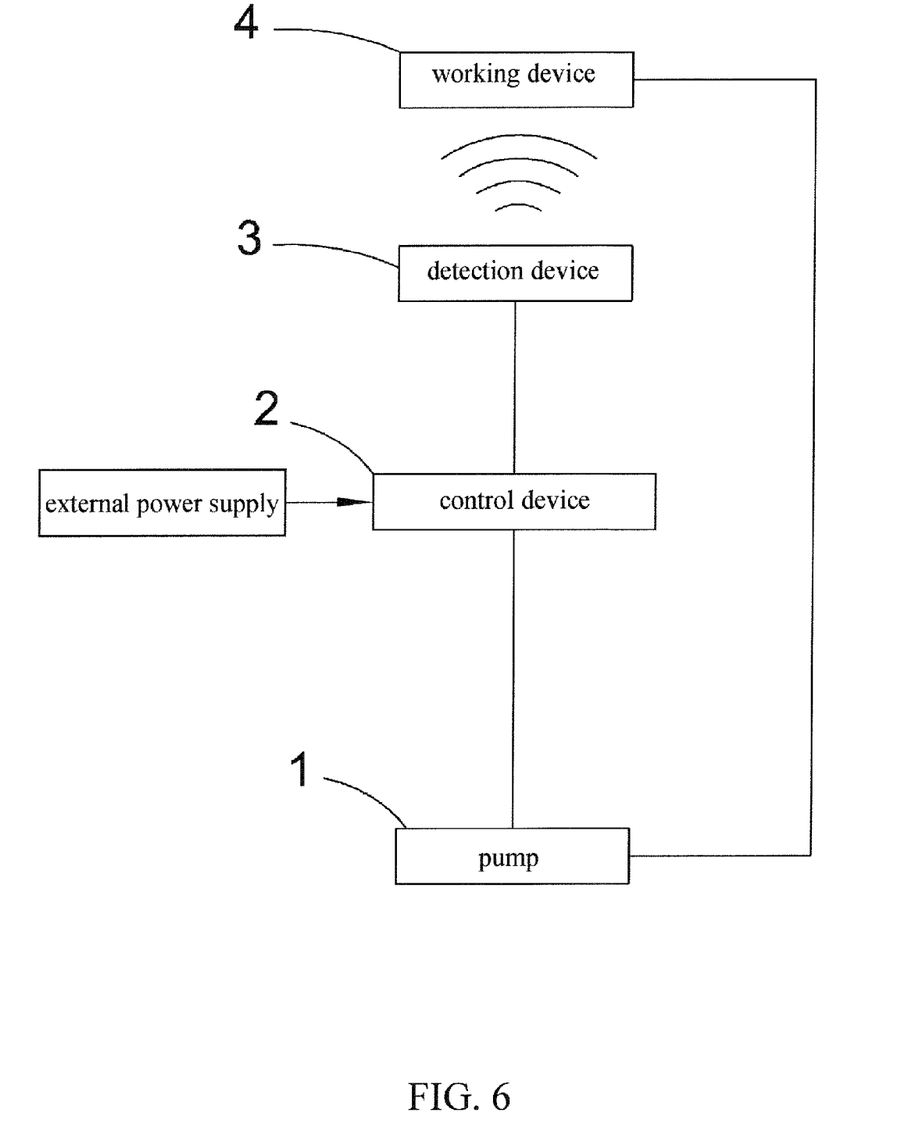
FIG. 6 is a schematic view illustrating image positioning according to a preferred embodiment.

Referring to FIG. 6, the detection device 3 is illustrated as an image positioner for illustrative explanation. The detection device 3 may detect the moving direction, the location, or the operation mode of the working device 4 (such as circling) within the detection zone thereof and transmits, in response to the result of detection, operation information to the control device 2 to change the operation, the fluid flow rate, the fluid pressure, or the fluid direction of the pump 1.

Thus, the essential factor that the improved pump control device of the present invention may improve the drawbacks of the prior art are as follows:

(1) The cooperative operation of the control device 2 and the detection device 3 provides an advantage of saving power for the present invention.

(2) The cooperative operation of the control device 2 and the detection device 3 provides advantages of easy use and cost reduction the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pump control device, comprising:
   a pump;
   a working device, which is connected to the pump;
   a detection device, which determines a working condition of the working device according to direction, location, or operation of the working device and generates operation information; and
   a control device, which is in information communication with the detection device and the pump to control the pump according to the operation information;
   wherein the detection device comprises an image positioner that detects and identifies an operation mode of the working device that includes a predetermined pattern of movement of the working device in a detection zone and generates the operation information in response to the detection and identification of the predetermined pattern of movement of the working device, the predetermined pattern of movement of the working device comprises circling of the working device.

2. The pump control device according to claim 1, wherein the pump comprises a mechanical device that uses suction force or pressure to supply or move liquid or to compress gas or to drive air into an object to be inflated.

3. The pump control device according to claim 2, wherein the pump comprises an air compressor.

4. The pump control device according to claim 1, wherein the pump, the control device, or the detection device is connected to at least one external power supply to receive a supply of electrical power therefrom and the external power supply comprises a regular power supply, an industrial power supply, or a battery.

5. The pump control device according to claim 1, wherein the working device comprises a pneumatic or hydraulic tool.

6. The pump control device according to claim 5, wherein the working device comprises one of a spraying pen, a spraying gun, an air supply gun, and a medical conduit.

7. The pump control device according to claim 1, wherein the working condition is selectively an active state or an inactive state.

8. The pump control device according to claim 7, wherein when the working device is in active state, the control device controls the pump to operate and vice versa.

9. The pump control device according to claim 1, wherein the pump supplies different fluid flow rates, fluid pressures, or fluid directions according to the operation information.

10. The pump control device according to claim 1, wherein the pump, the detection device, and the control device are connected to each other by means of wireless communication technology.

11. The pump control device according to claim 1, wherein the pump, the detection device, and the control device are connected to each other through physical connection and the pump, the detection device, and the control device are commonly arranged in an enclosure or physically coupled to the enclosure or are components that are connected to the enclosure.

* * * * *